(12) United States Patent
Matheis et al.

(10) Patent No.: US 10,928,413 B2
(45) Date of Patent: Feb. 23, 2021

(54) AIRCRAFT FREESTREAM DATA SYSTEMS

(71) Applicant: Rosemount Aerospace Inc., Burnsville, MN (US)

(72) Inventors: Brian Daniel Matheis, Lakeville, MN (US); Jaime Sly, Savage, MN (US); James Barron Egberg, St. Paul, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 158 days.

(21) Appl. No.: 16/153,358

(22) Filed: Oct. 5, 2018

(65) Prior Publication Data

US 2020/0110110 A1   Apr. 9, 2020

(51) Int. Cl.
| | |
|---|---|
| *G01P 13/02* | (2006.01) |
| *G01P 21/02* | (2006.01) |
| *G01P 5/24* | (2006.01) |
| *G01K 11/24* | (2006.01) |
| *G01K 13/02* | (2021.01) |

(52) U.S. Cl.
CPC .............. *G01P 5/245* (2013.01); *G01K 11/24* (2013.01); *G01K 13/02* (2013.01); *G01K 2013/024* (2013.01)

(58) Field of Classification Search
CPC .. G01K 11/24; G01K 13/02; G01K 2013/024; G01K 13/028; G01P 21/025; G01P 13/025; G01P 5/245; G01P 13/02; G01P 5/16; B64D 15/20; G01C 5/06
See application file for complete search history.

(56) References Cited

U.S. PATENT DOCUMENTS

| | | | |
|---|---|---|---|
| 4,112,756 A | | 9/1978 | MacLennan et al. |
| 4,378,696 A | * | 4/1983 | DeLeo ............... G01C 5/06 73/180 |
| 5,369,993 A | | 12/1994 | Hagan |
| 5,585,557 A | * | 12/1996 | Loschke ............. G01P 5/14 73/170.14 |

(Continued)

FOREIGN PATENT DOCUMENTS

| | | |
|---|---|---|
| EP | 0824669 B1 | 2/1998 |
| EP | 3333577 A1 | 6/2018 |
| FR | 3027398 A1 | 4/2016 |

OTHER PUBLICATIONS

Extended European search report issued in corresponding EP Application No. 19201552.7, dated Jan. 2, 2020.

*Primary Examiner* — Brandi N Hopkins
(74) *Attorney, Agent, or Firm* — Locke Lord LLP; Daniel J. Fiorello; Scott D. Wofsy (57) ABSTRACT

An aircraft freestream data system can include a first ultrasonic air data system (UADS) configured to sense local acoustic properties at a first location on an aircraft, a first local air data module operatively connected to the first UADS and configured to determine first local air data of the first location and to output first local air data, and a freestream data module operatively connected to the first local air data module. The freestream data module can be configured to receive the first local air data from the local air data module, determine one or more freestream air data parameters based on at least the first local air data, and output the one or more freestream air data parameters to one or more aircraft consuming systems.

20 Claims, 6 Drawing Sheets

(56) References Cited

U.S. PATENT DOCUMENTS

| | | |
|---|---|---|
| 6,253,166 B1 | 6/2001 | Whitmore et al. |
| 6,430,996 B1 * | 8/2002 | Anderson ............ G01K 13/028 |
| | | 73/170.26 |
| 7,155,969 B2 | 1/2007 | Drutowski et al. |
| 8,261,609 B2 | 9/2012 | Choisnet et al. |
| 8,261,610 B2 | 9/2012 | Choisnet |
| 9,612,252 B2 | 4/2017 | Waddington |
| 9,932,127 B2 | 4/2018 | Anderson et al. |
| 10,006,928 B1 | 6/2018 | Hagerott et al. |
| 10,012,668 B1 | 6/2018 | Daslund et al. |
| 2015/0135822 A1 | 5/2015 | Waddington |

* cited by examiner

AIRCRAFT FREESTREAM DATA SYSTEMS

BACKGROUND

1. Field

The present disclosure relates to aircraft data systems.

2. Description of Related Art

Ultrasonic anemometers (e.g., ultrasonic air data systems (UADS)) can be used to derive local flow data (e.g., local airspeed, wind angle, speed of sound) for any body by emitting an acoustic signal and determining a time-of-flight to various acoustic sensors. The time-of-flight between the transmitter and each receiver can be used to calculate the local air data. Traditional ultrasonic anemometers extend into the flow path and may work for very low flows and thin boundary layer, but this is a small portion of the aircraft flight envelope and installation locations on the aircraft. Therefore, traditional ultrasonic anemometers cannot be used as a primary air data source on aircraft.

Such conventional methods and systems have generally been considered satisfactory for their intended purpose. However, there is still a need in the art for improved systems, e.g., that provide the local air data and calibrate and/or derive freestream data from the local air data accurately such that an ultrasonic air data system (UADS) can function as a primary air data system on an aircraft through the entire flight envelope, for example. The present disclosure provides a solution for this need.

SUMMARY

An aircraft freestream data system can include a first ultrasonic air data system (UADS) configured to sense local acoustic properties at a first location on an aircraft, a first local air data module operatively connected to the first UADS and configured to determine first local air data of the first location and to output first local air data, and a freestream data module operatively connected to the first local air data module. The freestream data module can be configured to receive the first local air data from the local air data module, determine one or more freestream air data parameters based on at least the first local air data, and output the one or more freestream air data parameters to one or more aircraft consuming systems.

In certain embodiments, the first local air data module can be hosted within the UADS (e.g., within a computer module of the UADS). It is contemplated that the first local air data module and/or any suitable portion thereof can be hosted in any suitable location (e.g., in a common computer module with the freestream data module such as in an aircraft computer, in a UADS). It is contemplated that the freestream data module and/or any suitable portion thereof can be hosted in any suitable location (e.g., an aircraft computer or the UADS).

In certain embodiments, the system can include a second UADS configured to sense local acoustic properties at a second location on the aircraft, and a second local air data module operatively connected to the second UADS and configured to determine second local air data of the second location and to output second local air data. The freestream data module can be operatively connected to the second local air data module and is further configured to receive the second local air data from the local air data module, and determine the one or more freestream air data parameters based on at least the first and second local air data.

The second location can be at a diametrically opposed position on the aircraft. In certain embodiments, the second location can be a non-diametrically opposed position.

The first and/or second local air data parameters can include at least one of a first and/or second local airspeed, a first and/or second local wind angle, and a first and/or second local speed of sound, a first and/or second local air temperature, or a first and/or second local Mach number. Any suitable combination (e.g., a plurality, all) of these local air data parameters, and/or any suitable additional air data parameters are contemplated herein.

In certain embodiments, the one or more freestream air data parameters include at least one of aircraft true airspeed (TAS) or freestream air temperature. Any combination and/or additional air data parameters are contemplated herein (e.g., freestream angle-of-attack and/or angle-of-slip).

The system can include a first static pressure sensor operatively connected to the first UADS and the first local air data module to provide first local static pressure data of the first location to the first local air data module. In certain embodiments, the system can include a second static pressure sensor located at the second location on the aircraft, the second static pressure sensor configured to provide second local static pressure data of the second location. In certain embodiments, the second static pressure sensor can be directly connected to the freestream data module to provide the second local static pressure data to the freestream data module. In certain embodiments, the freestream module can be configured to determine one or more boundary layer effects and to calibrate the one or more freestream parameters based on the determined one or more boundary layer effects (e.g., determined using the static pressure data or any other suitable data).

In certain embodiments, the second static pressure sensor can be operatively connected to the second UADS and to the second local air data module to provide the second local static pressure data to the second local air data module. The first and/or second local air data parameters can include at least one of a first and/or second local airspeed, a first and/or second local wind angle, and a first and/or second local speed of sound, a first and/or second local air temperature, a first and/or second local Mach number, first and/or second local air density, or first and/or second local Reynolds number. Any other suitable combination (e.g., a plurality, all) of parameters, and/or any additional parameters is contemplated herein.

In certain embodiments, the system can include a third static pressure sensor operatively connected to the second UADS and the second local air data module to provide the second local static pressure data to the second local air data module. The system can include a second freestream data module operatively connected to the second local air data module, and a fourth static pressure sensor at the first location that is directly connected to the second freestream module to provide the second static pressure data to the second freestream module. In certain embodiments, the first freestream data module and second freestream module can be hosted on a separate device.

In certain embodiments, the first freestream data module and/or the second freestream data module can be configured to curve fit the first and/or second local air data to determine the freestream data. The first freestream data module and/or the second freestream data module can be configured to use a neural network to determine the freestream data. Any suitable processing logic (e.g., software and/or hardware) is contemplated herein to derive and/or calibrate freestream air data from the local air data.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
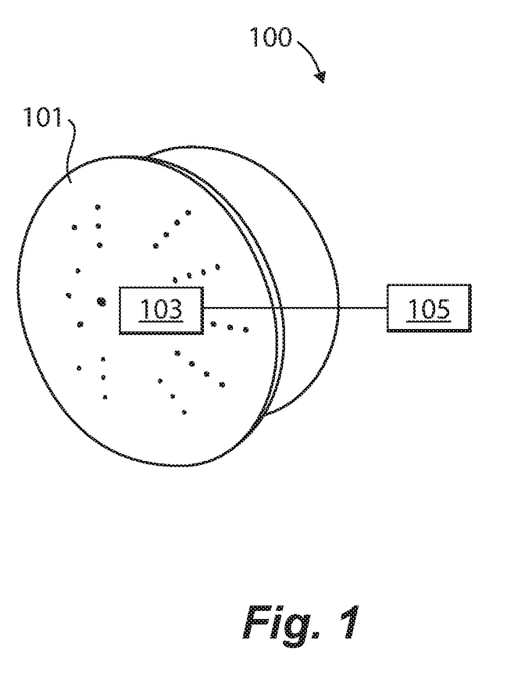
FIG. 1 is a perspective view of an embodiment of a system in accordance with this disclosure, showing an embodiment of an ultrasonic air data system (UADS) having a local air data module disposed therein.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-6.

Figure 2:
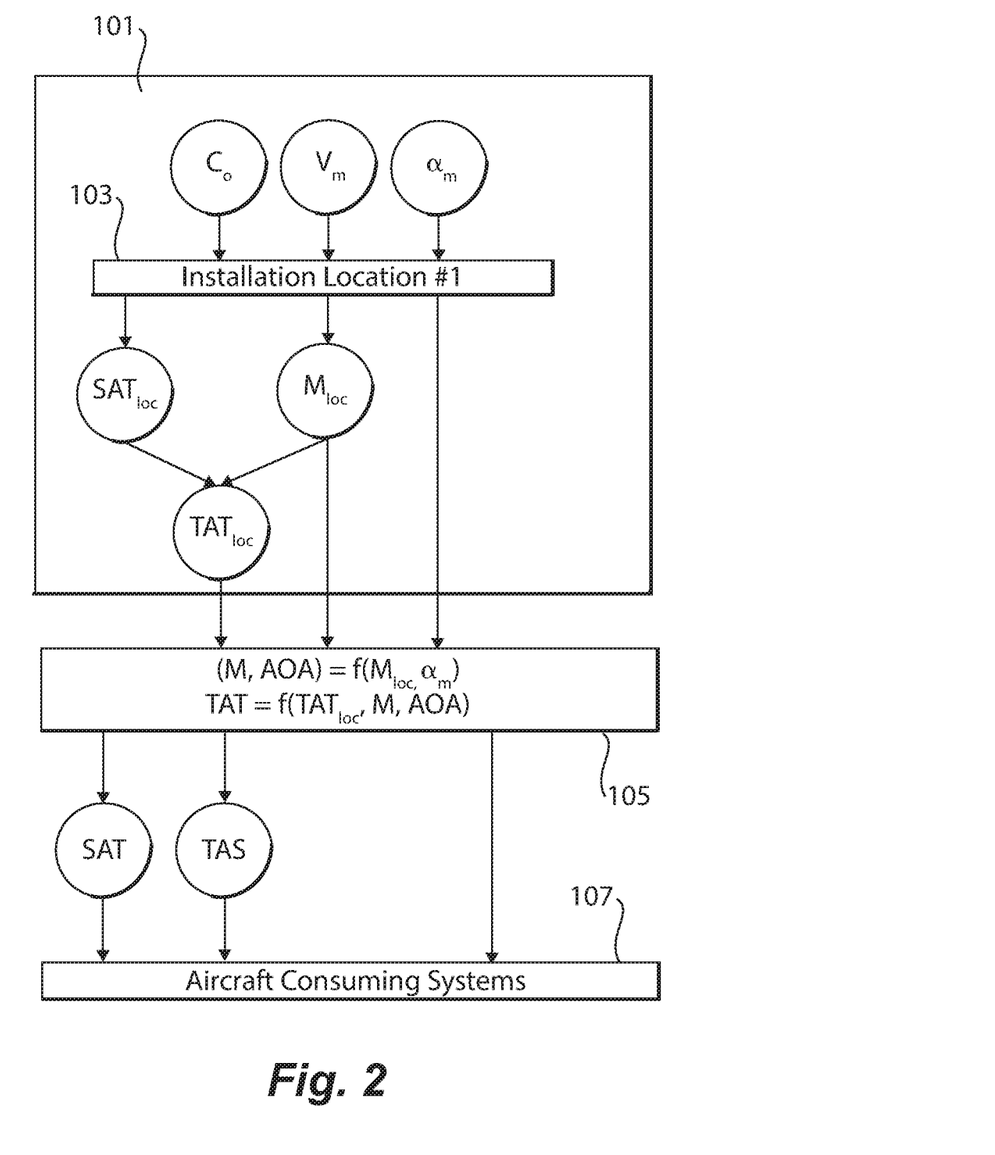
FIG. 2 is a schematic view of an embodiment of a system in accordance with this disclosure, showing an embodiment of data flow.

Referring to FIGS. 1 and 2, an aircraft freestream data system 100 can include a first ultrasonic air data system (UADS) 101 configured to sense local acoustic properties (e.g., time-of-flight between a transmitter and one or more receivers as appreciated by those having ordinary skill in the art) at a first location on an aircraft. The system 100 can include a first local air data module 103 operatively connected to the first UADS 101. The first local air data module 103 can include and/or be hosted on any suitable hardware and/or software as appreciated by one having ordinary skill in the art. The UADS can include any suitable hardware and/or software logic to derive initial air data (e.g., local airspeed, local wind angle, and local speed of sound) from the local acoustic properties to provide to the first local air data module 103. It is also contemplated that the local air data module 103 can derive the initial air data from the local acoustic properties instead of the UADS providing the initial air data. The first local air data module 103 can be configured to determine first local air data of the first location and to output first local air data (e.g., including the initial air data, derived and/or passed through from UADS).

The system 100 can include a freestream data module 105 operatively connected to the first local air data module 103. The freestream data module 105 can be configured to receive the first local air data from the local air data module 103, determine one or more freestream air data parameters based on at least the first local air data, and output the one or more freestream air data parameters to one or more aircraft consuming systems 107.

In certain embodiments, the first local air data module 103 can be hosted within the UADS 101 (e.g., within a computer module of the UADS 101 and/or in a separate computer module physically located on or within the UADS 101) as shown in FIG. 1. It is contemplated that the first local air data module and/or any suitable portion thereof can be hosted in any suitable location (e.g., in a common computer module with the freestream data module 105 such as in an aircraft computer, or in a UADS 101). It is contemplated that the freestream data module 105 and/or any suitable portion thereof can be hosted in any suitable location (e.g., an aircraft computer or the UADS 101).

Figure 3:
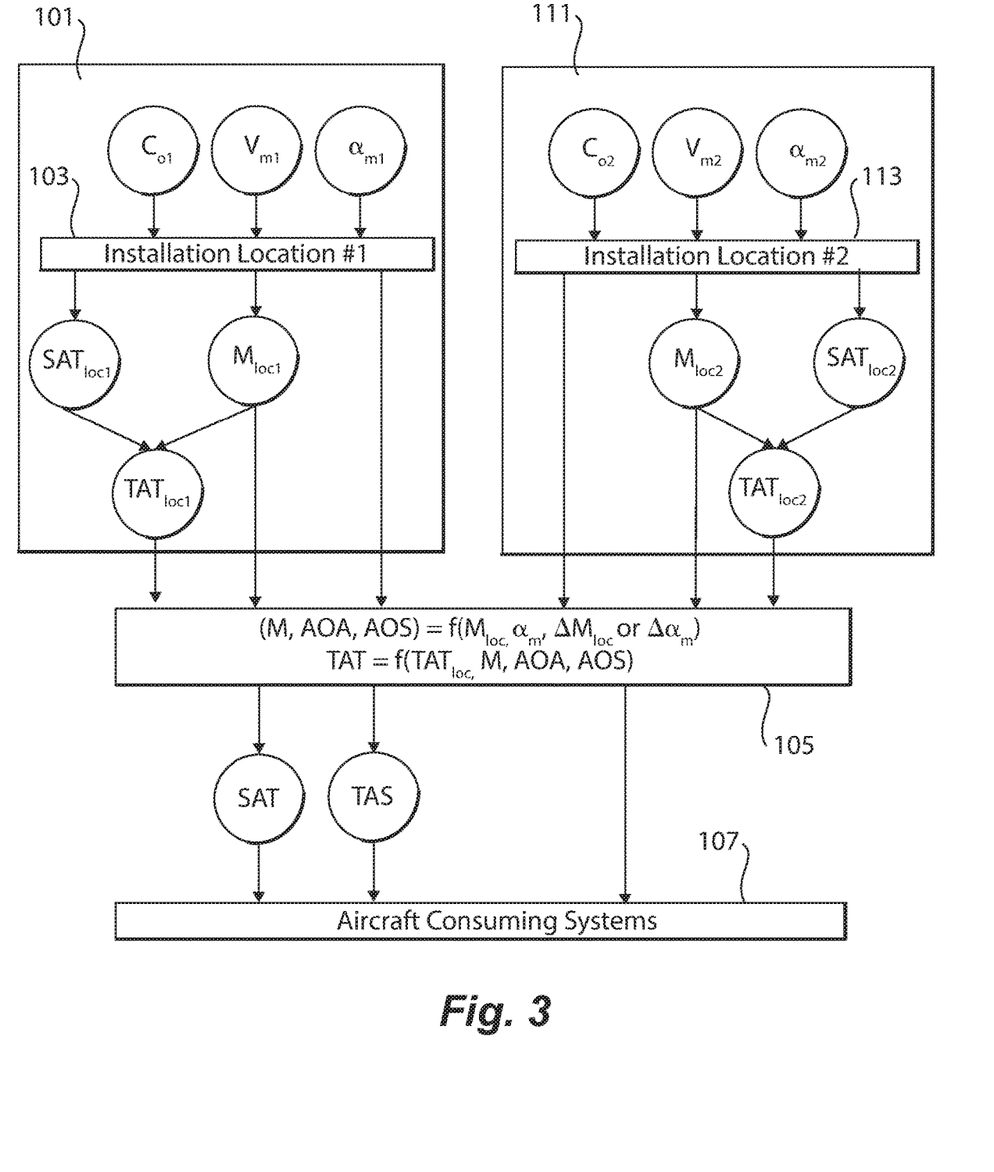
FIG. 3 is a schematic view of an embodiment of a system in accordance with this disclosure, showing an embodiment of data flow.

In certain embodiments, referring to FIG. 3, the system 100 can include a second UADS 111 configured to sense local acoustic properties at a second location on the aircraft. The second UADS 111 can be the same or similar to the first UADS 101, or have any other suitable configuration. The system 100 can include a second local air data module 113 operatively connected to the second UADS 111 and configured to determine second local air data of the second location and to output second local air data. The second local air data module 113 can be the same as or similar to the first local air data module 103, and/or have any other suitable configuration.

The freestream data module 105 can be operatively connected to the second local air data module 113 and can be further configured to receive the second local air data from the local air data module and to determine the one or more freestream air data parameters based on at least the first and second local air data (e.g., instead of and/or in addition to determining based on either of the first or second local air data individually).

The second location can be at a diametrically opposed position on the aircraft (e.g., 180 degrees apart on a circumference of the fuselage). In certain embodiments, the second location can be a non-diametrically opposed position. Dissimilar positions can allow more accurate determination of freestream conditions by the freestream data module 105 by combining and/or comparing (e.g., averaging) the first local air data and the second local air data.

As shown in FIGS. 1-3, the first and/or second local air data parameters can include at least one (e.g., all) of a first and/or second local airspeed, a first and/or second local wind angle, and a first and/or second local speed of sound, a first and/or second local air temperature (e.g., local static air temperature (SAT) and/or local total air temperature (TAT)), or a first and/or second local Mach number. Any suitable combination (e.g., a plurality, all) of these local air data parameters, and/or any suitable additional air data parameters are contemplated herein.

In certain embodiments, the one or more freestream air data parameters include at least one of aircraft true airspeed (TAS) or freestream air temperature (e.g., freestream SAT, freestream TAT). Any combination and/or additional air data parameters are contemplated herein.

Figure 4:
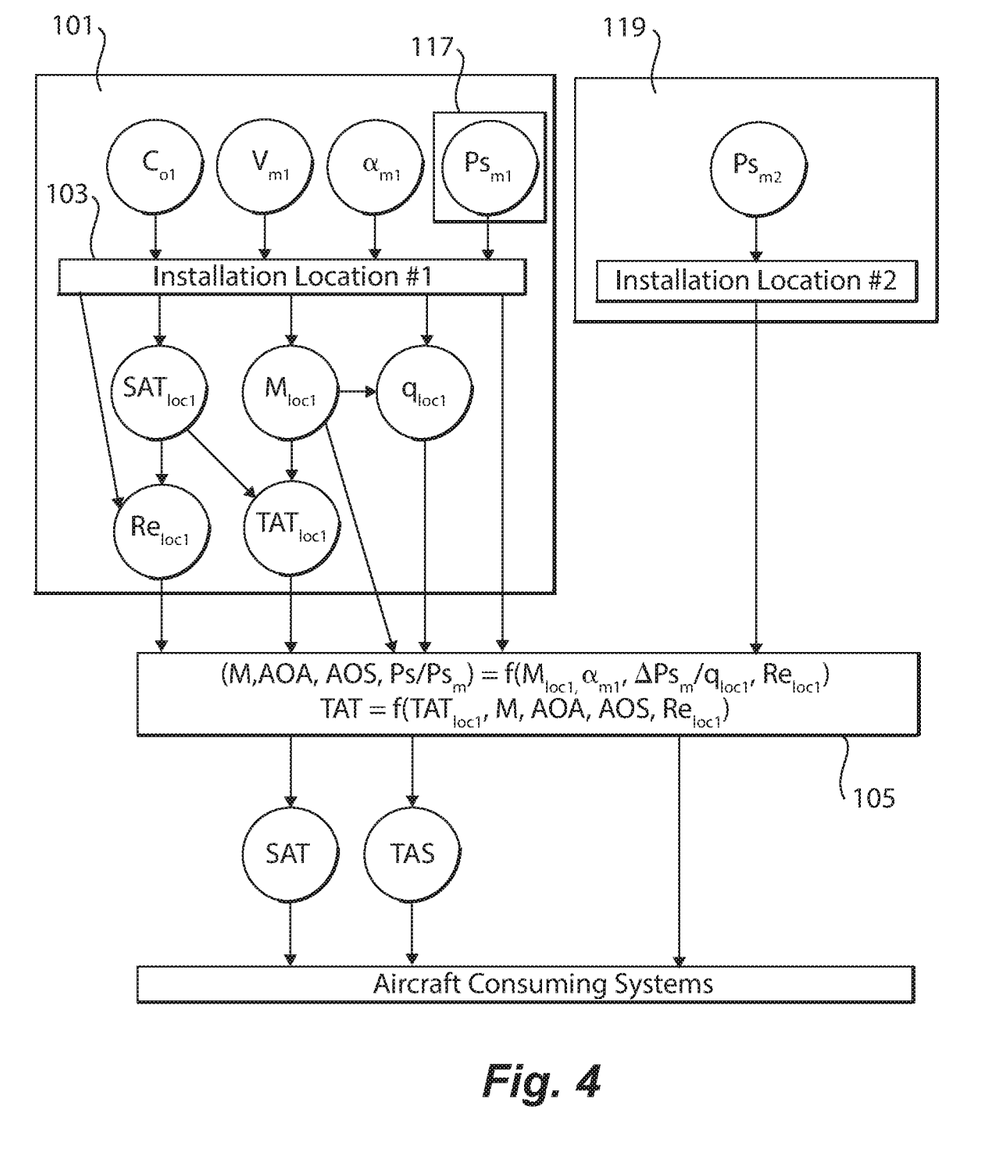
FIG. 4 is a schematic view of an embodiment of a system in accordance with this disclosure, showing an embodiment of data flow.

Referring to FIG. 4, the system 100 can further include a first static pressure sensor 117 operatively connected to the first UADS 101 (e.g., a static pressure port and/or transducer disposed on the first UADS 101 or near the UADS) and the first local air data module 103 to provide first local static pressure data of the first location to the first local air data module 103. In certain embodiments, the system 100 can include a second static pressure sensor 119 located at the second location on the aircraft, the second static pressure sensor 119 configured to provide second local static pressure data of the second location (e.g., a diametrically opposed position or otherwise as described above). In certain embodiments, the second static pressure sensor 119 can be directly connected to the freestream data module 105 to provide the second local static pressure data to the freestream data module 105.

Figure 5:
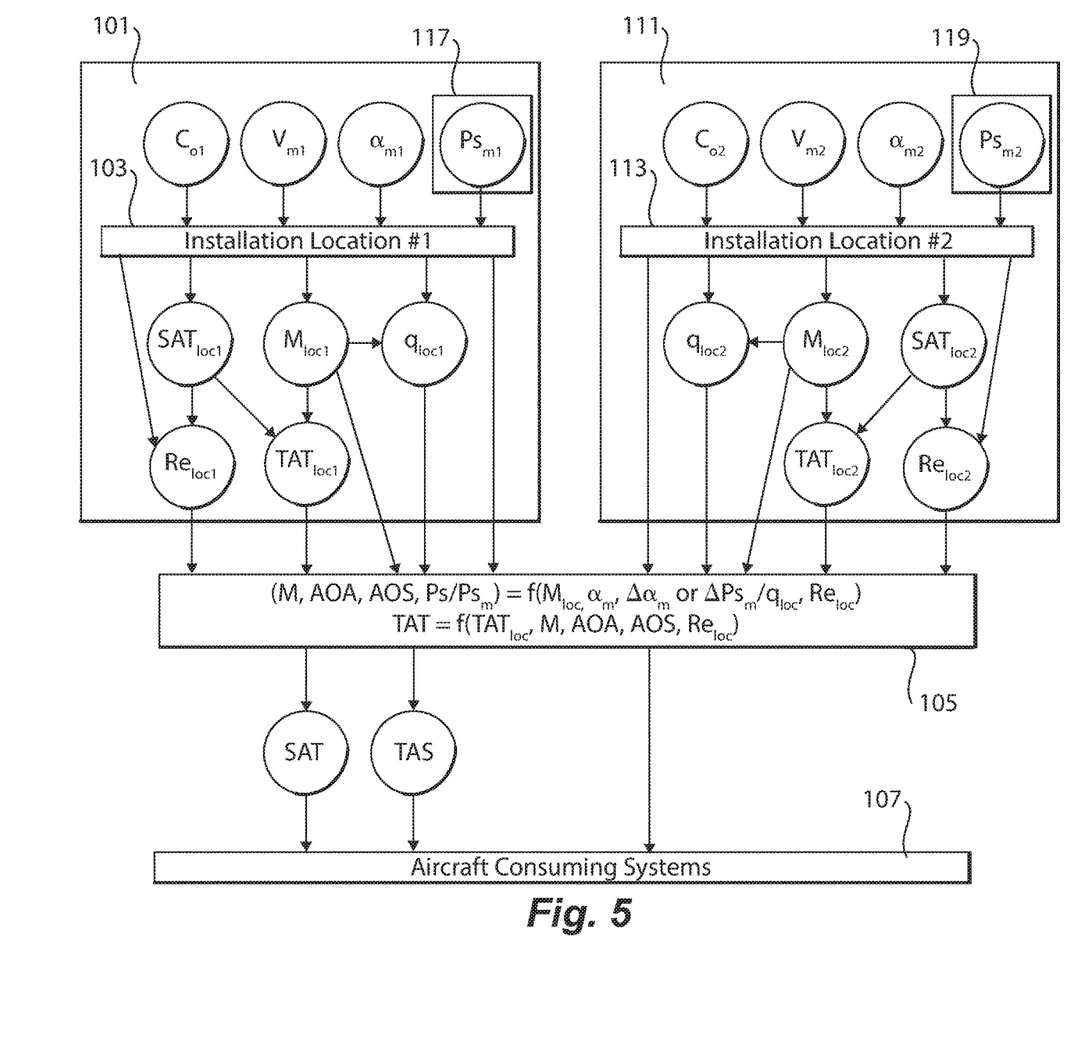
FIG. 5 is a schematic view of an embodiment of a system in accordance with this disclosure, showing an embodiment of data flow.

Referring to FIG. 5, in certain embodiments, the second static pressure sensor 119 can be operatively connected to the second UADS 111 and to the second local air data module 113 to provide the second local static pressure data to the second local air data module 113. Any other suitable position and/or connection is contemplated herein.

Figure 6:
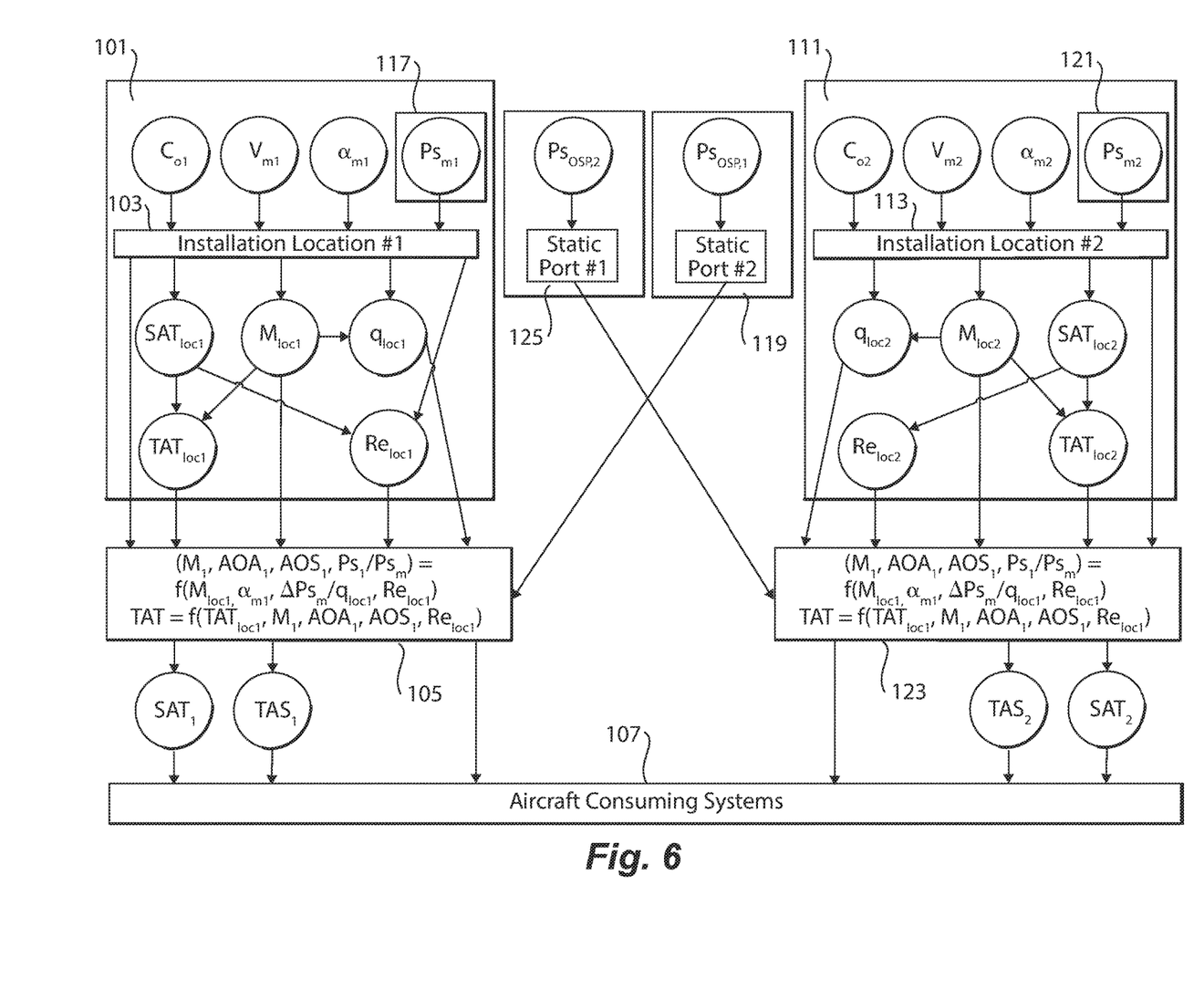
FIG. 6 is a schematic view of an embodiment of a system in accordance with this disclosure, showing an embodiment of data flow.

In certain embodiments, the freestream module 105 can be configured to determine one or more boundary layer effects and to calibrate the one or more freestream parameters based on the determined one or more boundary layer effects. For example, as appreciated by those having ordinary skill in the art, boundary layer effects can be determined and/or accounted for by using the static pressure data or any other suitable data (e.g., surface temperature sensor and/or skin friction data, etc.). As shown in FIGS. 4-6, the first and/or second local air data parameters can include at least one of a first and/or second local airspeed, a first and/or second local wind angle, and a first and/or second local speed of sound, a first and/or second local air temperature, a first and/or second local Mach number, first and/or second local air density, or first and/or second local Reynolds number. Any other suitable combination (e.g., a plurality, all) of parameters, and/or any additional parameters are contemplated herein.

In certain embodiments, referring to FIG. 6, the system 100 can include a third static pressure sensor 121 operatively connected to the second UADS 111 and the second local air data module 113 to provide the second local static pressure data to the second local air data module 113. The system 100 can include a second freestream data module 123 operatively connected to the second local air data module 113 and a fourth static pressure sensor 125 at the first location that is directly connected to the second freestream module 123 to provide the second static pressure data to the second freestream module 123. In certain embodiments, the first freestream data module 105 and a second freestream module 123 can be hosted on separate devices. Any other suitable location is contemplated herein (e.g., hosted in the same computer device). The one or more of the static pressure sensors do not need to be co-located with one or more UADS, and any suitable location for one or more of the static pressure sensors is contemplated herein.

In certain embodiments, the first freestream data module 105 and/or the second freestream data module 123 can be configured to curve fit the first and/or second local air data to determine the freestream data. The first freestream data module 105 and/or the second freestream data module 123 can be configured to use a neural network to determine the freestream data. Any suitable processing logic (e.g., software and/or hardware) is contemplated herein to derive and/or calibrate freestream air data from the local air data.

Embodiments include a new concept for the measurement of aircraft air data which involves the use of an Ultrasonic Air Data System (UADS) comprised of one or more ultrasonic transmitters and sensors. The basic concept behind UADS is the time-of-flight (TOF) measurement from an ultrasonic source to a receiver or set of receivers. The TOF is the time required for a sound wave to travel from a source to a receiver. The TOF can be directly correlated to the local airflow velocity. In addition, the relative TOF among multiple receivers can be used to determine a local flow angle, e.g., a local angle-of-attack or angle-of-slip. A similar approach can also be used to extract a measurement of the local speed of sound, which is directly related to the local static temperature.

Therefore, a single line replaceable unit (LRU) is capable of providing, at a minimum, local true airspeed, $V_m$, local angle-of-attack, $\alpha_m$, and local speed-of-sound, $c_0$. An example of a single LRU UADS 101 with a single source and multiple receivers is shown in FIG. 1, for example.

The term "local" is with regard to what is directly measured by the UADS sensor, whereas what is ultimately desired by an air data system is the freestream conditions through which the aircraft is flying. In addition, the aircraft altitude can be of primary concern to the aircraft, whereas existing UADS are not currently capable of measuring this parameter. Embodiments include approaches for determining flight data at the aircraft (freestream) level, including, e.g., calibration of the system, and certain embodiments can combine data from multiple sensors in order to derive/account for certain effects and/or to improve accuracy and/or to improve safety.

Certain embodiments include a static pressure port and/or sensor added to the UADS. This can either be integrated with the UADS as an additional orifice and sensor, or can be a separate LRU which is dedicated to making the static pressure measurement, for example. Like other parameters, this would be a local static pressure. Obtaining a dissimilar air data measurement relative to traditional systems is still largely met as the static pressure measurement is typically not prone to common mode errors that can occur for probes which protrude into the flow (e.g. icing and volcanic ash).

There is some need in the industry for a dissimilar (relative to traditional approaches) system that provides only airspeed (and possibly angle-of-attack) at reduced accuracy levels for the purposes of an emergency back-up. A single UADS sensor can provide this information. An example embodiment of this is shown in FIG. 2. As shown, embodiments can apply curve fitting, and/or apply data to a neural net, and/or use empirical data correlating local to freestream, and output calibrated freestream data (e.g., SAT and TAS as shown).

One challenge with the UADS approach is the sensitivity of the TOF measurement to the boundary-layer thickness and profile. For the architecture shown in FIG. 2, there is no measurement or indication of boundary layer conditions. For this reason, Mach number can be chosen as a primary calibration parameter (as opposed to true airspeed) since the Mach number is the ratio of two speeds measured by the UADS and therefore at least some if not all of the boundary layer effects and be cancelled in the Mach number calculation by the freestream module. In general it may be desired for the boundary-layer effect to be as uniform and well-behaved as possible. This means that a location of the UADS sensors may be further downstream on the fuselage (e.g., relative to traditional Pitot-static probes) in order to avoid any issues relating to flow transition or icing or damage on the radome.

The relationships utilized by the freestream module to convert local data to freestream data can be readily determined by flight testing the system against a set of reference sensors without undue experimentation. Because there is no compensation for relative sideslip with a single UADS sensor, either reduced accuracy must be accepted or the sensor must be located in a location that is relatively insensitive to sideslip. A system as presented in FIG. 2 provides a low fidelity solution to dissimilar air data as it does not include a static pressure measurement and does not correct for boundary-layer or sideslip effects. However, it can provide a good rough order estimation of the airspeed and AOA.

Embodiments include a second UADS (e.g., identical to the first UADS) located symmetrically opposite on the aircraft to compensate for sideslip, e.g., as shown in FIG. 3. The local airspeed, speed-of-sound and angle-of-attack from each sensor can be electronically averaged (or averaged in any other suitable way) to provide a sideslip compensated value, e.g., for sensors mounted on the side of the aircraft. In addition, the difference between either the local airspeeds or the local angle-of-attack or a combination of the two can be used as an indication of the sideslip angle. FIG. 3 shows a flow diagram of a two sensor baseline architecture, for example. Parameters ending with a subscript "1" indicate those parameters that are directly measured (or calculated) by the first UADS sensor 101, while parameters ending with a subscript "2" indicate those parameters that are directly measured (or calculated) by the second UADS 111 which is located on the opposite side of the aircraft (not necessarily symmetrically). Embodiments as shown in FIG. 3 reduces and/or eliminates sensitivity to slip and can broaden out the locations where the UADS sensors can be placed (e.g., in a side slip sensitive location, e.g., more toward nose of airplane or away from 90 degrees from top). Parameters without either a "1" or "2" at the end of the subscript indicate an average of local signals from each of two sensors, respectively. The "Δ" indicates a difference between the parameters while no subscript indicates freestream parameters.

Both sensors can utilize identical calculations and provide input to the freestream module which can provide an aircraft level calibration. In embodiments having a plurality of UADS, the aircraft level calibration can use information from both sensors to make appropriate corrections for and/or calculations of sideslip.

The relationships utilized by the freestream module to convert local data to freestream data can be readily determined by flight testing the system against a set of reference sensors without undue experimentation. Embodiments as shown in FIG. 3 can provide a moderate fidelity solution to dissimilar air data as it also includes compensation for sideslip effects but still does not include a static pressure measurement and does not correct for boundary-layer effects.

Embodiments as shown in FIG. 4 can include a single UADS with static pressure measurement coupled with a static pressure port on the opposite side of the aircraft. The static pressure measurement from the second location may only be used for sideslip calculation and compensation in certain embodiments. The static pressure measurement can be used to calculate Reynolds number as shown (e.g., for determination of boundary layer conditions/effects). Location of the sensors can affect the accuracy of such embodiments. In particular, sufficient sideslip sensitivity may be required at the chosen location, which would typically correspond to a location that is more forward on the fuselage. This can depend on how sensitive other parameters (i.e. true airspeed, angle-of-attack, etc.) are to sideslip angle. Such embodiments are a simpler configuration compared to certain embodiments, e.g., as shown FIG. 5, and can utilize only added static ports and only a single UADS. The static pressure ports/sensors can be separate units, or integrated in any suitable manner with the UADS (e.g., second port placed on other side of aircraft and connected to UADS, or could be connected to central computer (e.g., that is or includes a freestream module as shown).

Embodiments can output any suitable freestream air data parameter, derived or corrected from local data (e.g., one or more of TAS, SAT, TAT, Mach number, AOA, TAT, Reynolds number). With well-chosen locations as appreciated by those having ordinary skill in the art in view of this disclosure and without undue experimentation, embodiments, e.g., as shown in FIG. 4 can provide full air data with the highest possible level of accuracy for the UADS. However, the complexity, and thus cost, can be reduced compared to more complex configuration, e.g., as shown in FIGS. 5 and 6.

Embodiments as shown in FIG. 5 include a static pressure measurement for each UADS. As with the embodiment of FIG. 4, a static pressure measurement can allow for a calculation of the aircraft altitude and also allows for the determination of a Reynolds number parameter, allowing for the possibility of correcting for boundary-layer effects. This correction can be done by freestream module in the most general sense since boundary-layer thickness can be a function of the other flight parameters as well. Alternatively or additionally, the boundary-layer correction can be done as an additional post-processing step after other primary corrections/derivations have been determined in order to keep the primary corrections as simple as possible.

There are other options for providing the boundary-layer correction contemplated herein. For example, a skin friction and/or heat flux measurement device can be integrated with the UADS 101. Both of these parameters are a function of the Reynolds number and thus can provide an indication of boundary-layer thickness. However, an advantage of using a static pressure measurement is that it also provides a means for calculating altitude (e.g., which can be used to further improve accuracy) and it has a long history of usage and robustness within the industry.

Embodiments, e.g., as shown in FIG. 5, can provide a complete air data solution and allows for the highest accuracy in terms of aircraft level corrections and has the most flexibility in terms of installation locations. In such embodiments, there may be redundant information that may drive unnecessary complexity and cost which could otherwise be better utilized. Such embodiments can be able to account for boundary layer effects, and further broaden out where sensors can be placed (e.g., in a place more affected by boundary layer effect, e.g., more towards the nose).

With the asymmetric architecture of certain embodiments, e.g., as shown in FIG. 4, certain embodiments can include at least some of the complexity of the architecture of the embodiment of FIG. 5 to bring the additional benefit of having dual redundant systems. Such an embodiment is shown schematically in FIG. 6. In addition to having two complete UADS sensors (with integrated Ps measurement), two static ports can be added to provide independent and/or additional sideslip compensation. The additional static pressure measurement can provide two independent systems that have full compensation. These additional static pressure measurements can be additional LRU's or, optionally, can be integrated with the UADS sensors (i.e., two Ps measurements on each UADS sensor) in order to keep the total number of LRU's at two. Embodiments as shown in FIG. 6 can be two of the embodiment of FIG. 4 for dual redundancy (e.g., for fault discovery/safety). As can be seen in FIG. 6, the aircraft consuming systems can receive two independent sets of fully compensated air data.

Certain embodiments can employ various other configurations based on the UADS sensor. A number of these options are discussed hereinbelow.

Certain embodiments can accomplish sideslip compensation by coupling the UADS sensor with either another UADS sensor or a static pressure port. However, it is also contemplated that embodiments can be coupled with a traditional mechanical vane on the opposite side of the aircraft for sideslip compensation. A vane is a relatively robust measurement device which can still provide some level of dissimilar air data when coupled with a UADS sensor. The combination of the local AOA from the UADS sensor and the AOA from the vane would provide a means of correcting for and calculating sideslip, assuming probe locations are chosen appropriately, which can be determined by one having ordinary skill in the art without undue experimentation.

Embodiments can have the one or more UADS sensor located on the side of the aircraft in order to be able to make an AOA measurement. However, it is also possible to locate the one or more sensors on the top and/or bottom of the aircraft (e.g., either the fuselage or the wings), in order to obtain an AOS signal as a direct measurement of each sensor instead of as a derived signal by combining multiple sensors. In such a case, e.g., if there are no AOA determining sensors, aircraft AOA can be determined from the differential between two or more top and bottom sensors, similar to how aircraft AOS is determined in opposing side located sensors.

In certain embodiments, a single UADS sensor mounted on the bottom or top of an air vehicle can be able to provide 360° windspeed and direction if installed in an appropriate location. This can be particularly beneficial in rotorcraft applications where this information is important in hover conditions.

The refraction of sound waves in the boundary-layer is a function of the speed-of-sound profile within the boundary-layer. This speed-of-sound profile can be affected by both a temperature variation and a relative humidity variation. The profiles for these two parameters may be significantly different than the velocity profile for a number of reasons. Therefore, additional corrections may be utilized for these effects to improve the accuracy of the system. One approach to addressing this would be to embed sensors within the UADS sensor itself to estimate the wall temperature, $T_w$, and/or the wall relative humidity, $RH_w$. The calibration algorithm could then calculate an effective speed-of-sound at the wall, $c_w$, and use the difference between $c_w$ and $c_0$ as an additional parameter in the correction.

Embodiments of disclosure describe multiple architectures and configurations that allow the usage of one or more UADS sensors to provide a partial or complete air data solution at the aircraft level, depending on the level of accuracy and dissimilarity required for a particular application. Embodiments can be utilized as a primary air data system on an aircraft through the entire flight envelope.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a mad-only memory (ROM), an erasable programmable read-only memory (EPROM or Flash memory), an optical fiber, a portable compact disc mad-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An aircraft freestream data system, comprising:
a first ultrasonic air data system (UADS) configured to sense local acoustic properties at a first location on an aircraft;
a first local air data module operatively connected to the first UADS and configured to determine first local air data of the first location and to output first local air data;
a freestream data module operatively connected to the first local air data module and configured to:
receive the first local air data from the local air data module;
determine one or more freestream air data parameters based on at least the first local air data; and
output the one or more freestream air data parameters to one or more aircraft consuming systems,
a second UADS configured to sense local acoustic properties at a second location on the aircraft; and
a second local air data module operatively connected to the second UADS and configured to determine second local air data of the second location and to output second local air data, wherein the freestream data module is operatively connected to the second local air data module and is further configured to:
receive the second local air data from the local air data module; and
determine the one or more freestream air data parameters based on at least the first and second local air data,
wherein the first and/or second local air data parameters include at least one of a first and/or second local wind angle, a first and/or second local speed of sound, a first and/or second local air temperature, or a first and/or second local Mach number.

2. The system of claim 1, wherein the first local air data module is hosted within the UADS.

3. The system of claim 1, wherein the second location is at a diametrically opposed position on the aircraft.

4. The system of claim 1, wherein the one or more freestream air data parameters include at least one of aircraft true airspeed (TAS) or freestream air temperature.

5. The system of claim 1, further comprising a first static pressure sensor operatively connected to the first UADS and the first local air data module to provide first local static pressure data of the first location to the first local air data module.

6. The system of claim 5, wherein the freestream module is configured to determine one or more boundary layer effects and to calibrate the one or more freestream parameters based on the determined one or more boundary layer effects.

7. The system of claim 5, further comprising a second static pressure sensor located at a second location on the aircraft, the second static pressure sensor configured to provide second local static pressure data of the second location.

8. The system of claim 7, wherein the second location is at a diametrically opposed position on the aircraft.

9. The system of claim 7, wherein the second static pressure sensor is directly connected to the freestream data module to provide the second local static pressure data to the freestream data module.

10. The system of claim 7, further comprising:
a second UADS configured to sense local acoustic properties at the second location on the aircraft; and
a second local air data module operatively connected to the second UADS and configured to determine second local air data of the second location and to output second local air data, wherein the freestream data module is operatively connected to the second local air data module and is further configured to:
receive the second local air data from the local air data module; and
determine the one or more freestream air data parameters based on at least the first and second local air data.

11. The system of claim 10, wherein the second static pressure sensor is operatively connected to the second UADS and to the second local air data module to provide the second local static pressure data to the second local air data module.

12. The system of claim 10, wherein the first and/or second local air data parameters include at least one of a first and/or second local airspeed, a first and/or second local wind angle, and a first and/or second local speed of sound, a first and/or second local air temperature, a first and/or second local Mach number, first and/or second local air density, or first and/or second local Reynolds number.

13. The system of claim 12, wherein the first freestream data module and second freestream module is hosted on a separate device.

14. The system of claim 13, wherein the first freestream data module and/or the second freestream data module is configured to curve fit the first and/or second local air data to determine the freestream data.

15. The system of claim 13, wherein the first freestream data module and/or the second freestream data module is configured to use a neural network to determine the freestream data.

16. The system of claim 5, further comprising a second UADS at the second location of the aircraft, a second local air data module, a third static pressure sensor operatively connected to the second UADS and the second local air data module to provide the second local static pressure data to the second local air data module, a second freestream data module operatively connected to the second local air data module, and a fourth static pressure sensor at the first location and directly connected to the second freestream module to provide the second static pressure data to the second freestream module.

17. An aircraft freestream data system, comprising:
  a first ultrasonic air data system (UADS) configured to sense local acoustic properties at a first location on an aircraft;
  a first local air data module operatively connected to the first UADS and configured to determine first local air data of the first location and to output first local air data;
  a freestream data module operatively connected to the first local air data module and configured to:
    receive the first local air data from the local air data module;
    determine one or more freestream air data parameters based on at least the first local air data; and
    output the one or more freestream air data parameters to one or more aircraft consuming systems;
  a first static pressure sensor operatively connected to the first UADS and the first local air data module to provide first local static pressure data of the first location to the first local air data module; and
  a second UADS at the second location of the aircraft, a second local air data module, a third static pressure sensor operatively connected to the second UADS and the second local air data module to provide the second local static pressure data to the second local air data module, a second freestream data module operatively connected to the second local air data module, and a fourth static pressure sensor at the first location and directly connected to the second freestream module to provide the second static pressure data to the second freestream module.

18. An aircraft freestream data system, comprising:
  a first ultrasonic air data system (UADS) configured to sense local acoustic properties at a first location on an aircraft;
  a first local air data module operatively connected to the first UADS and configured to determine first local air data of the first location and to output first local air data;
  a freestream data module operatively connected to the first local air data module and configured to:
    receive the first local air data from the local air data module;
    determine one or more freestream air data parameters based on at least the first local air data; and
    output the one or more freestream air data parameters to one or more aircraft consuming systems;
  a first static pressure sensor operatively connected to the first UADS and the first local air data module to provide first local static pressure data of the first location to the first local air data module;
  a second static pressure sensor located at a second location on the aircraft, the second static pressure sensor configured to provide second local static pressure data of the second location;
  a second UADS configured to sense local acoustic properties at the second location on the aircraft; and
  a second local air data module operatively connected to the second UADS and configured to determine second local air data of the second location and to output second local air data, wherein the freestream data module is operatively connected to the second local air data module and is further configured to:
    receive the second local air data from the local air data module; and
    determine the one or more freestream air data parameters based on at least the first and second local air data,
  wherein the first and/or second local air data parameters include at least one of a first and/or second local airspeed, a first and/or second local wind angle, and a first and/or second local speed of sound, a first and/or second local air temperature, a first and/or second local Mach number, first and/or second local air density, or first and/or second local Reynolds number, wherein the first freestream data module and second freestream module is hosted on a separate device.

19. The aircraft freestream data system of claim 18, wherein the first freestream data module and/or the second freestream data module is configured to curve fit the first and/or second local air data to determine the freestream data.

20. The aircraft freestream data system of claim 18, wherein the first freestream data module and/or the second freestream data module is configured to use a neural network to determine the freestream data.

* * * * *